United States Patent
Shimono (10) Patent No.: US 8,937,415 B2
(45) Date of Patent: Jan. 20, 2015

(54) ROTARY ELECTRIC MACHINE HAVING MOTOR COVER WITH EXHAUST HOLE IN COUNTER-LOAD SIDE DIRECTION

(75) Inventor: Hirofumi Shimono, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 175 days.

(21) Appl. No.: 13/370,308

(22) Filed: Feb. 10, 2012

(65) Prior Publication Data

US 2013/0093272 A1 Apr. 18, 2013

(30) Foreign Application Priority Data

Oct. 18, 2011 (JP) ................................. 2011-228876

(51) Int. Cl.
*H02K 9/00* (2006.01)
*H02K 9/06* (2006.01)
*H02K 9/14* (2006.01)
*H02K 5/22* (2006.01)

(52) U.S. Cl.
CPC . *H02K 9/14* (2013.01); *H02K 5/225* (2013.01)
USPC ................ 310/64; 310/52; 310/58; 310/60 R; 310/63

(58) Field of Classification Search
CPC .................................. H02K 9/06; H02K 5/20
USPC ................. 310/52, 60 R, 62, 63, 64
See application file for complete search history.

(56) References Cited

U.S. PATENT DOCUMENTS

| | | | |
|---|---|---|---|
| 1,751,424 A * | 3/1930 | Rosenthal | 310/53 |
| 3,643,119 A * | 2/1972 | Lukens | 310/60 R |
| 3,761,748 A * | 9/1973 | Baumann et al. | 310/58 |
| 4,712,660 A | 12/1987 | Erndt et al. | |
| 2007/0273220 A1* | 11/2007 | Koyama et al. | 310/58 |

FOREIGN PATENT DOCUMENTS

| | | |
|---|---|---|
| CN | 101090216 | 12/2007 |
| DE | 10125611 A1 * | 12/2002 |
| FR | 2838252 A1 * | 10/2003 |
| JP | 54-054809 U | 4/1979 |
| JP | 55155533 A * | 12/1980 |

(Continued)

OTHER PUBLICATIONS

Machine Translation JP09201007 (1997).*

(Continued)

*Primary Examiner* — Tran Nguyen
*Assistant Examiner* — Jose Gonzalez Quinones
(74) *Attorney, Agent, or Firm* — Mori & Ward, LLP (57) ABSTRACT

A rotary electric machine according to embodiments includes a tubular motor frame, a tubular motor cover, and a cooling fan. The motor frame includes therein a stator and a rotor. The motor cover houses the motor frame and includes a suction hole for cooling air at its counter-load side and an exhaust hole at its load side. Herein, the exhaust hole turns the exhaust direction of the cooling air to the counter-load side. The cooling fan sucks the cooling air from the suction hole into the motor cover and exhausts the cooling air from the exhaust hole to the outside of the motor cover.

10 Claims, 6 Drawing Sheets

(56) References Cited

FOREIGN PATENT DOCUMENTS

| | | | |
|---|---|---|---|
| JP | 61-251448 | | 11/1986 |
| JP | 02-110963 U | | 9/1990 |
| JP | 04-311700 | | 11/1992 |
| JP | 05-030703 | | 2/1993 |
| JP | 07-147754 | | 6/1995 |
| JP | 09-201007 | | 7/1997 |
| JP | 09201007 A | * | 7/1997 |
| JP | 09322478 A | * | 12/1997 |
| JP | 2002-272180 | | 9/2002 |
| JP | 2005-94949 | | 4/2005 |
| KR | 10-1997-0008788 | | 2/1997 |
| KR | 2000-0059398 | | 10/2000 |

OTHER PUBLICATIONS

Machine Translation DE10125611 (2002), JP09322478 (1997) and FR2838252 (2003).*

Japanese Decision of a Patent Grant for corresponding JP Application No. 2011-228876, Sep. 24, 2013.

Japanese Office Action for corresponding JP Application No. 2011-228876, Jul. 9, 2013.

Korean Office Action for corresponding KR Application No. 10-2012-0020304, Jun. 25, 2014.

Chinese Office Action for corresponding CN Application No. 201210048481.4, Aug. 4, 2014.

* cited by examiner

ROTARY ELECTRIC MACHINE HAVING MOTOR COVER WITH EXHAUST HOLE IN COUNTER-LOAD SIDE DIRECTION

CROSS-REFERENCE TO RELATED APPLICATION

This application is based upon and claims the benefit of priority of the prior Japanese Patent Application No. 2011-228876, filed on Oct. 18, 2011, the entire contents of which are incorporated herein by reference.

FIELD

The embodiments discussed herein are directed to a rotary electric machine.

BACKGROUND

There is a conventional rotary electric machine that includes a motor frame that includes therein a stator and a rotor, a motor cover that covers the motor frame, and a ventilation flue for cooling air that is located in a space between the motor cover and the motor frame. The rotary electric machine has been known as disclosed in, for example, Japanese Laid-open Patent Publication No. H9-201007. The rotary electric machine can include a cooling fan that is attached to the motor cover to suck air from a load side into the ventilation flue and exhaust the air from a counter-load side.

SUMMARY

A rotary electric machine according to an aspect of embodiments includes a tubular motor frame, a tubular motor cover, and a cooling fan. The motor frame includes therein a stator and a rotor. The motor cover houses the motor frame and includes a counter-load-side suction hole for cooling air and a load-side exhaust hole that turns the exhaust direction of the cooling air to the counter-load side. The cooling fan sucks the cooling air from the suction hole into the motor cover and exhaust the cooling air from the exhaust hole to the outside of the motor cover.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, a rotary electric machine according to embodiments of the present disclosure will be explained in detail with reference to the accompanying drawings. In addition, the embodiments disclosed below are not intended to limit the present invention.

In the embodiments described below, a rotary electric machine is explained as an example in which a rotating shaft is connected to a machine tool that is a load and the machine tool is driven by rotating the rotating shaft. However, a device that is the load of the rotary electric machine is not limited to the machine tool. Hereinafter, with respect to the axial direction of the rotating shaft, it is assumed that a side to which the machine tool is connected is a load side and an opposite side of the side to which the machine tool is connected is a counter-load side.

First Embodiment

Figure 1:
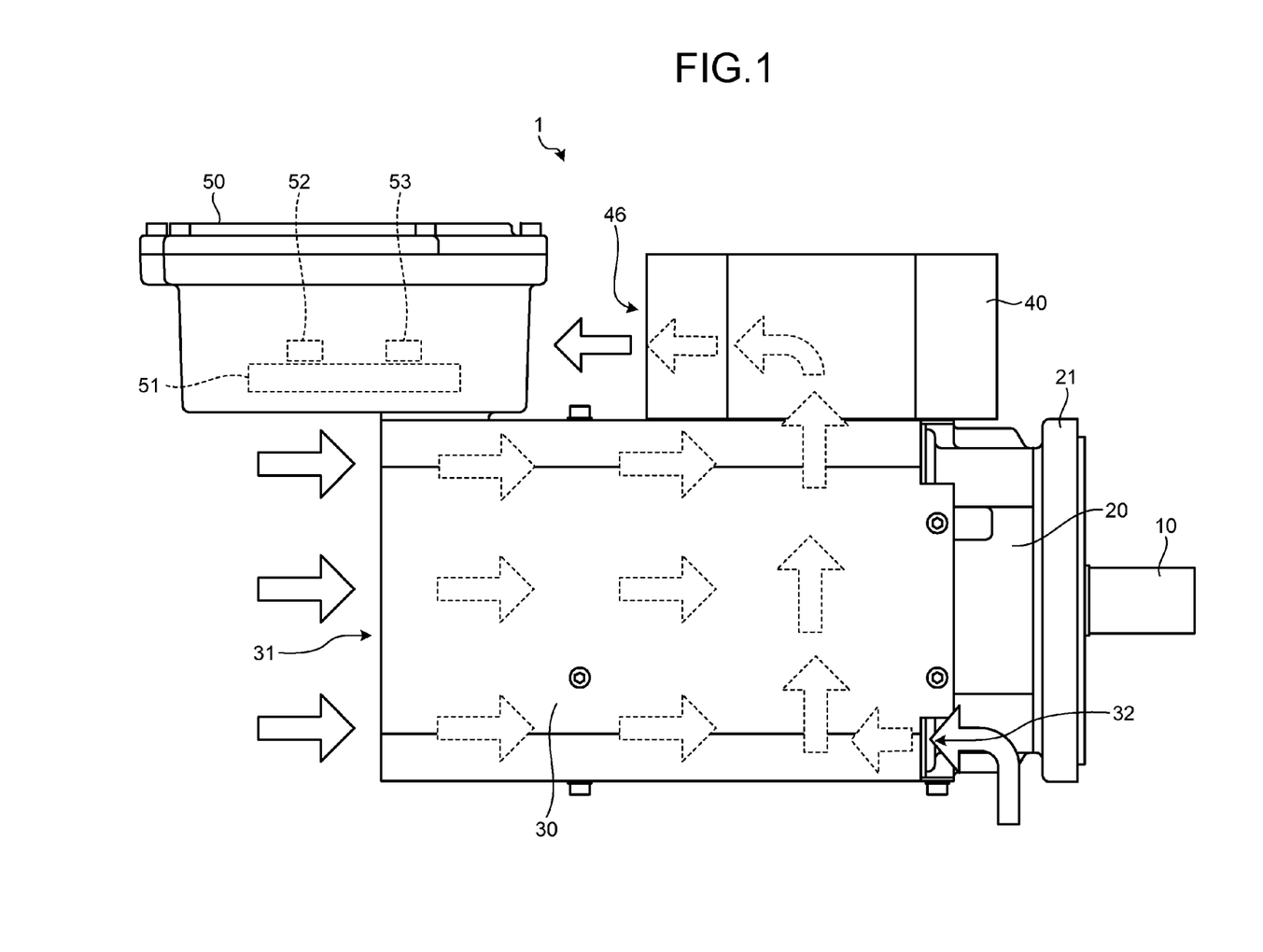
FIG. 1 is an explanation diagram illustrating a rotary electric machine when being seen from its side according to a first embodiment.

FIG. 1 is an explanation diagram illustrating a rotary electric machine 1 when being seen from its side according to the first embodiment. As illustrated in FIG. 1, the rotary electric machine 1 includes a tubular motor frame 20 that includes therein a stator, a rotor, and the like for driving a rotating shaft 10 to be connected to a machine tool. A load-side bracket 21 that bears the rotating shaft 10 at its load side is attached to the load side of the motor frame 20. Moreover, the details of the internal structure of the motor frame 20 are described below with reference to FIGS. 2 to 4.

The rotary electric machine 1 further includes a tubular motor cover 30 that covers the motor frame 20 and a fan case 40 that houses a cooling fan provided on a load-side circumferential surface of the motor cover 30. Furthermore, the rotary electric machine 1 includes a terminal box 50 that houses a terminal board 51 on which external connection terminals 52 and 53 are provided.

The motor cover 30 includes a first suction hole 31 that is provided at a counter-load side to suck cooling air and a communicating hole that is provided on its load-side circumferential surface to communicate with the inside of the fan case 40. Furthermore, the motor cover 30 includes a second suction hole 32 smaller than the first suction hole 31 on a circumferential surface facing the fan case 40 while placing the motor frame 20 therebetween. The fan case 40 includes an exhaust hole 46 that exhausts the cooling air to the counter-load side.

The rotary electric machine 1 drives the cooling fan of the fan case 40 to suck cooling air from the first suction hole 31 and the second suction hole 32 into the motor cover 30 as indicated by a white-space solid-line arrow of FIG. 1.

Then, the cooling air sucked into the motor cover 30 passes through a ventilation flue formed between an inner circumferential surface of the motor cover 30 and an outer circumferential surface of the motor frame 20 and then is exhausted from the exhaust hole 46 of the fan case 40 to the outside of the motor cover 30, as indicated by a white-space dotted-line arrow of FIG. 1.

In this way, the rotary electric machine 1 exhausts the cooling air, which is sucked from the counter-load side into the motor cover 30, toward the counter-load side via the fan case 40 provided on the load-side outer circumferential surface of the motor cover 30.

As a result, because the rotary electric machine 1 can suppress the temperature rise of the counter-load side inside the motor cover 30, the rotary electric machine 1 can favorably cool a counter-load-side bearing 24 (see FIG. 2) to be described below that bears the rotating shaft 10 at its counter-load side.

Moreover, because the rotary electric machine 1 includes the second suction hole 32 on the outer circumferential surface of the motor cover 30 facing the fan case 40 while placing the motor frame 20 therebetween, the rotary electric machine 1 can effectively cool the load-side inside of the motor cover 30.

Figure 2:
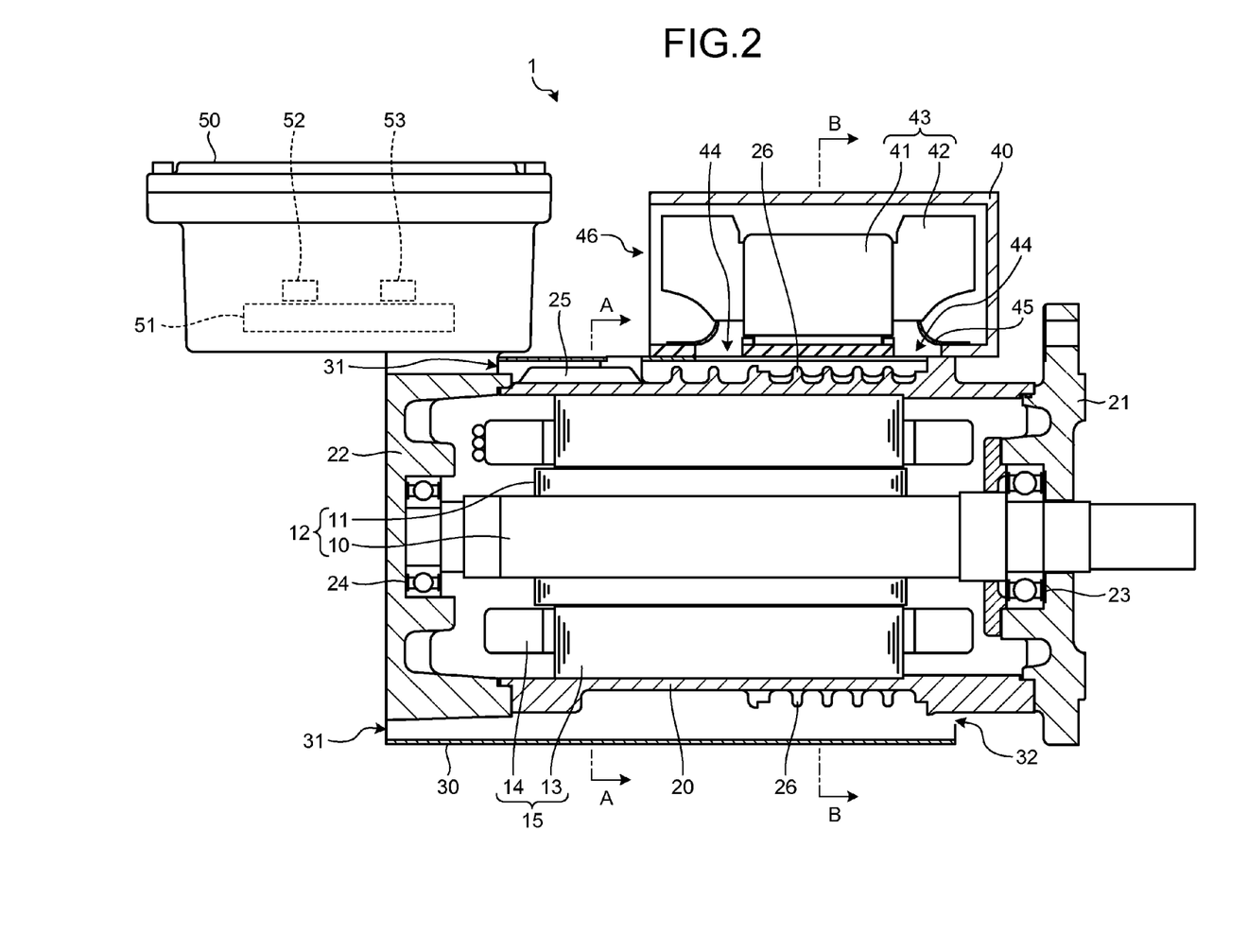
FIG. 2 is a partially sectional schematic diagram illustrating the rotary electric machine when being seen from its side according to the first embodiment.

Hereinafter, the internal structure and effects of the rotary electric machine 1 according to the first embodiment will be explained in detail with reference to FIGS. 2 to 4. FIG. 2 is a partially sectional schematic diagram illustrating the rotary electric machine 1 when being seen from its side according to the first embodiment. The cross section of components excluding the terminal box 50 is illustrated in FIG. 2.

Figure 3:
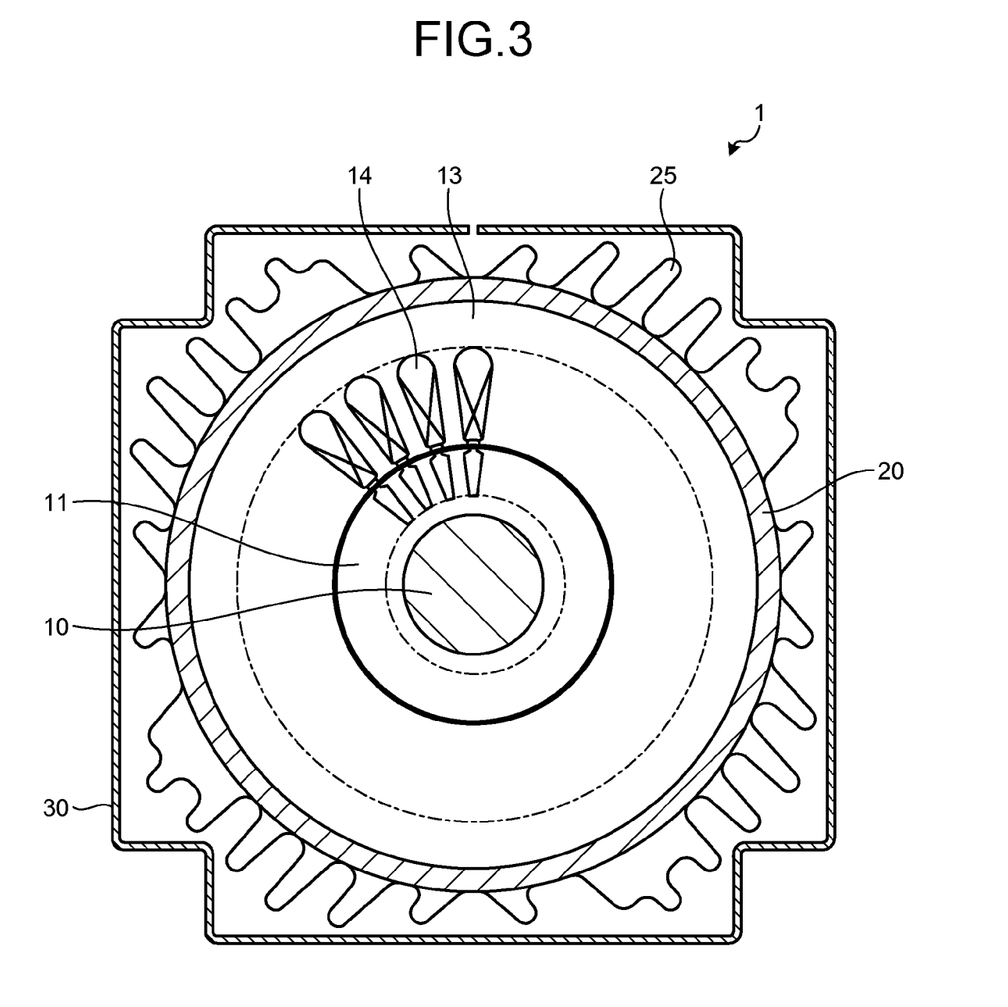
FIG. 3 is a pattern diagram illustrating a cross section of the rotary electric machine when being seen from an A-A line of FIG. 2 according to the first embodiment.

FIG. 3 is a pattern diagram illustrating a cross section of the rotary electric machine 1 when being seen from an A-A line of FIG. 2 according to the first embodiment. FIG. 4 is a pattern diagram illustrating a cross section of the rotary electric machine 1 when being seen from a B-B line of FIG. 2 according to the first embodiment. The same components of FIGS. 2 to 4 as those of FIG. 1 have the same reference numbers. Moreover, a part of a stator coil 14 is omitted in FIGS. 3 and 4 from the viewpoint of simplification of the drawings.

As illustrated in FIG. 2, the rotary electric machine 1 includes the tubular motor cover 30. The motor cover 30 houses therein the tubular motor frame 20. Moreover, the load-side bracket 21 that bears the rotating shaft 10 by using a load-side bearing 23 at its load side is attached to the load side of the motor frame 20.

On the other hand, a counter-load-side bracket 22 that bears the rotating shaft 10 by using the counter-load-side bearing 24 at its counter-load side is attached to the counter-load side of the motor frame 20. Moreover, the terminal box 50 that houses the terminal board 51 on which the external connection terminals 52 and 53 of the rotary electric machine 1 are provided is attached on the outer circumferential surface of the counter-load-side bracket 22.

The motor frame 20 houses therein driving units of the rotary electric machine 1 such as a stator 15 and a rotor 12. More specifically, the stator 15 includes a circular stator core 13 and the stator coil 14 wound on the teeth of the stator core 13, and further is shrunk fit onto the inner circumferential surface of the motor frame 20.

The rotor 12 is a cage rotor formed by casting an aluminum conductor into a slot formed on a cylindrical rotor core 11. The rotating shaft 10 is fitted to the inner circumferential surface of the rotor core 11. Because the rotating shaft 10 is supported by the load-side bearing 23 and the counter-load-side bearing 24 as described above, the outer circumferential surface of the rotor 12 is rotatably placed opposite to the inner circumferential surface of the stator 15.

The rotary electric machine 1 lets an electric current flow into the stator coil 14 of the stator 15 to generate a rotating magnetic field on the inner side of the stator 15. Then, the rotary electric machine 1 rotates the rotor 12 by using the rotating magnetic field to rotate the rotating shaft 10. At this time, the stator 15 emits heat in connection with the operation.

The heat is transmitted to the counter-load-side bearing 24 via the motor frame 20 and the counter-load-side bracket 22. As a result, the counter-load-side bearing 24 can be thermally deformed to give a bad influence to the counter-load-side bearing 24.

Therefore, the motor cover 30 of the rotary electric machine 1 includes the first suction hole 31 at its counter-load side in order to suppress the temperature rise of the counter-load-side bearing 24, and further includes the fan case 40 for housing a cooling fan 43 at its load-side outer circumferential surface. The fan case 40 includes the exhaust hole 46 that exhausts cooling air to the counter-load side.

The internal space of the fan case 40 and the internal space of the motor cover 30 communicate with each other via a communicating hole 44. A guide 45 that guides the cooling air from the internal space of the motor cover 30 to the internal space of the fan case 40 is provided on the circumferential surface of the communicating hole 44.

Herein, the cooling fan 43 that is housed in the fan case 40 is a centrifugal fan that includes: a fan body 41 that includes therein a driving motor; and a blade 42 that rotates around the fan body 41 by using the driving motor.

As described above, the cooling fan 43 is placed on the load-side outer circumferential surface of the motor frame 20 or the motor cover 30. In other words, the cooling fan 43 is placed at a position at which a distance from a load-side end is shorter than a distance from a counter-load-side end of the motor frame 20 or the motor cover 30.

The cooling fan 43 drives the driving motor of the fan body 41 to rotate the blade 42, and thus exhausts the cooling air, which is sucked out from the internal space of the motor cover 30 via the communicating hole 44, from the exhaust hole 46 of the fan case 40 to the counter-load side.

As a result, when the cooling fan 43 is driven, the cooling air is sucked from the first suction hole 31 provided at the counter-load side into the motor cover 30. Then, the cooling air flowed into the motor cover 30 passes through the ventilation flue, which is formed between the inner circumferential surface of the motor cover 30 and the outer circumferential surfaces of the motor frame 20, from its counter-load side to its load side, and then is exhausted from the exhaust hole 46 to the counter-load side by way of the cooling fan 43 along the outer circumferential surface of the motor cover 30.

In other words, the cooling air sucked from the first suction hole 31 flows to the load side along the outer circumferential surface of the counter-load-side bracket 22 and then is exhausted from the exhaust hole 46 by way of the outer circumferential surface of the motor frame 20 that houses the stator 15 that is a heat source.

Therefore, the rotary electric machine 1 absorbs heat from the motor frame 20, which is heated by the stator 15 and he like, and thus the cooling air heated up does not flow to the counter-load-side bracket 22. As a result, because the rotary electric machine 1 can cool the counter-load-side bracket 22 by using cooling air that is not overheated before touching with the motor frame 20, the rotary electric machine 1 can effectively cool the counter-load-side bearing 24 that is provided in the counter-load-side bracket 22.

Because the rotary electric machine 1 can suppress the temperature rise of the counter-load-side bracket 22, the degradation of a detection accuracy of a rotation position caused by the temperature rise can be prevented when a detector that detects the rotation position of the rotating shaft 10 is provided in the counter-load-side bracket 22, for example.

It has been explained in the first embodiment that a centrifugal fan is used as the cooling fan 43. However, the cooling fan 43 is not limited to a centrifugal fan. For example, the cooling fan 43 can employ an axial-flow fan. When an axial-flow fan is used as the cooling fan 43, the axial-flow fan is provided in the fan case 40 in the state where the rotation axis of the axial-flow fan is set to be parallel with the rotating shaft 10 of the rotary electric machine 1 in such a manner that the ventilation direction of the axial-flow fan is directed to the counter-load side.

Because the axial-flow fan is provided in this way, cooling air can be sucked from the counter-load side into the motor cover 30 and then be exhausted to the outside of the motor cover 30 by way of the axial-flow fan from the exhaust hole 46 toward the counter-load direction.

Moreover, the motor cover 30 includes the second suction hole 32 smaller than the first suction hole 31 at the position facing the cooling fan 43 on the load-side circumferential surface while placing the motor frame 20 therebetween. Herein, it has been explained that the second suction hole 32 is provided on the load-side end of the motor cover 30. However, the second suction hole may be formed by providing a slit on the circumferential surface of the motor cover 30 facing the cooling fan 43 while placing the motor frame 20 therebetween.

As a result, in the case of the rotary electric machine 1, because cooling air flows in from the outside to the side to which the cooling fan 43 is not attached and to which the cooling air is hard to flow compared to the side to which the cooling fan 43 is attached, a temperature difference between the side to which the cooling fan 43 is attached and the side to which the cooling fan 43 is not attached is mitigated. Therefore, the rotary electric machine 1 can effectively cool the entire inside of the motor cover 30.

Because the second suction hole 32 is formed to be smaller than the first suction hole 31, it can be prevented that an air capacity of the cooling air flowing from the counter-load side to the load side inside the motor cover 30 becomes smaller than an air capacity of the cooling air sucked from the second suction hole 32.

Moreover, the rotary electric machine 1 forcibly exhausts the cooling air, which absorbs heat from the inside of the motor cover 30, from the exhaust hole 46 to the counter-load side along the outer circumferential surface of the motor cover 30. As a result, the rotary electric machine 1 can prevent a load-side machine tool from being thermally deformed due to the cooling air exhausted from the exhaust hole 46.

As illustrated in FIG. 2, the terminal box 50 of the rotary electric machine 1 is placed opposite to the exhaust hole 46 on the outer circumferential surface of the counter-load-side bracket 22. As a result, in the case of the rotary electric machine 1, because the heat of the counter-load-side bracket 22 is transmitted to the terminal box 50 and the terminal box 50 is cooled by reusing the cooling air exhausted from the exhaust hole 46, the temperature rise of the counter-load-side bearing 24 can be suppressed by cooling the counter-load-side bracket 22.

Moreover, the rotary electric machine 1 includes a plurality of first radiation fins 25 and a plurality of second radiation fins 26 on the outer circumferential surface of the motor frame 20 in order to improve a cooling efficiency of the motor frame 20. More specifically, as illustrated in FIGS. 2 and 3, the first radiation fins 25 are provided on the counter-load-side outer circumferential surface of the motor frame 20 to extend in the direction parallel to the axial direction of the rotating shaft 10.

Figure 4:
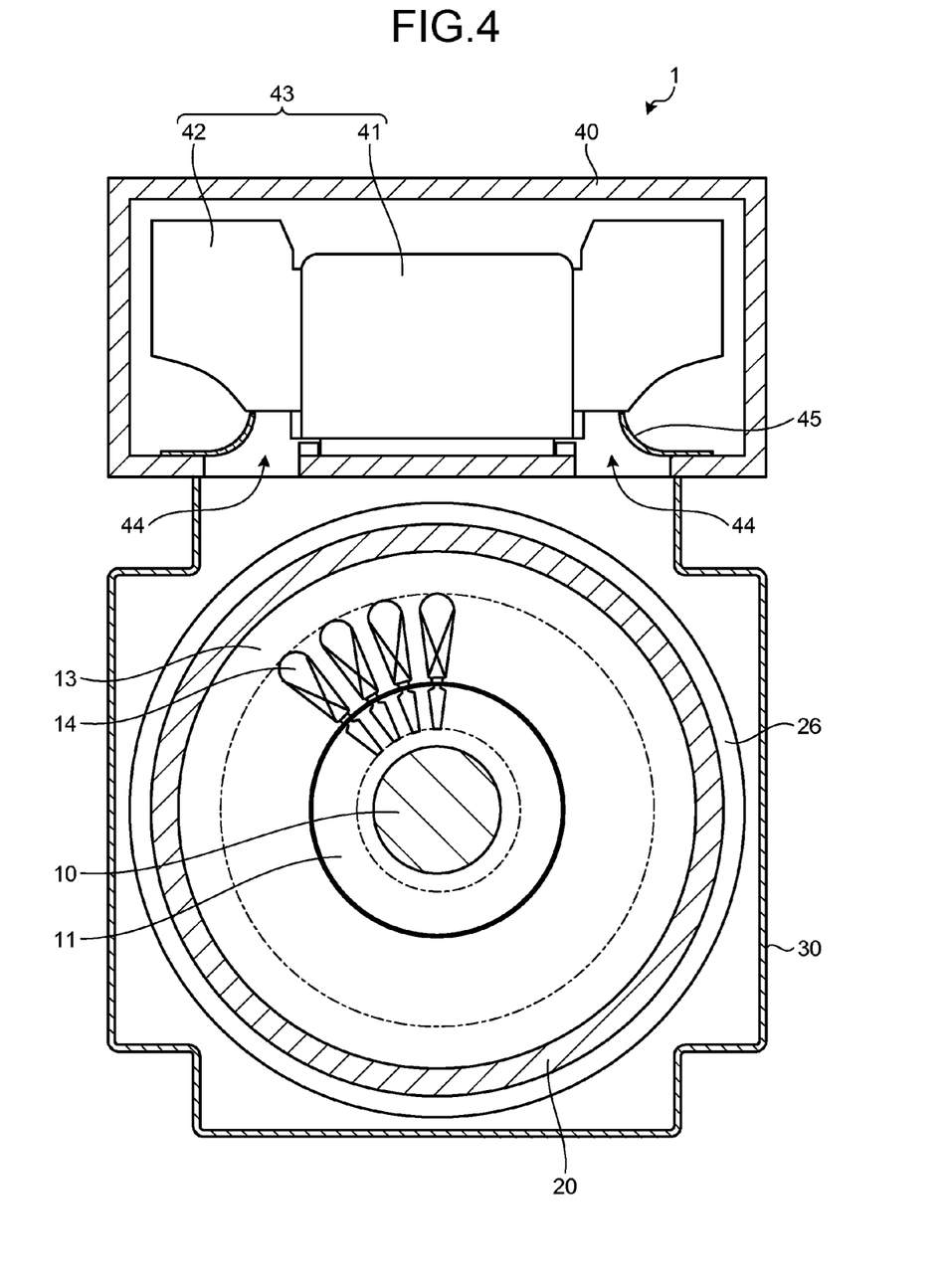
FIG. 4 is a pattern diagram illustrating a cross section of the rotary electric machine when being seen from a B-B line of FIG. 2 according to the first embodiment.

As illustrated in FIGS. 2 and 4, the second radiation fins 26 are provided on the load-side outer circumferential surface of the outer circumferential surface on which the first radiation fins 25 are provided to extend in the circumferential direction of the motor frame 20.

In this way, because the motor frame 20 includes the plurality of radiation fins (the first radiation fins 25 and the second radiation fins 26) on its outer circumferential surface, a radiation surface area is enlarged. As a result, the motor frame 20 can make cooling air effectively absorb the internally generated heat.

As illustrated in FIGS. 2 and 3, the first radiation fins 25 extend from the counter-load side to the load side of the motor frame 20. Moreover, as illustrated in FIGS. 2 and 4, the second radiation fins 26 extend in the circumferential direction of the motor frame 20 to surround the outer circumferential surface of the motor frame 20.

As illustrated in FIGS. 2 and 4, in the rotary electric machine 1, the cooling fan 43 is provided in the state where the suction surface of the cooling fan 43 is placed opposite to a part of the outer circumferential surface of the motor frame 20 on which the second radiation fins 26 are arranged.

As a result, when the cooling fan 43 is driven, cooling air flows from the first suction hole 31 to the second radiation fins 26 along the extending direction of the first radiation fins 25, and then is absorbed into the cooling fan 43 along the extending direction of the second radiation fins 26 and is exhausted from the exhaust hole 46.

In this way, the first radiation fins 25 and the second radiation fins 26 function as a guide for introducing cooling air into the cooling fan 43. As a result, the rotary electric machine 1 can exhaust cooling air from the exhaust hole 46 without making the cooling air stay inside the motor cover 30 to effectively cool the inside of the motor cover 30.

As described above, the rotary electric machine 1 according to the first embodiment exhausts the cooling air, which is sucked from the counter-load side into the motor cover 30, from the load side to the counter-load side toward the outside of the motor cover 30. As a result, the rotary electric machine 1 according to the first embodiment can prevent the cooling air heated inside the motor cover 30 from badly influencing the counter-load-side bearing 24 that is attached to the counter-load-side bracket 22.

Second Embodiment

Figure 5:
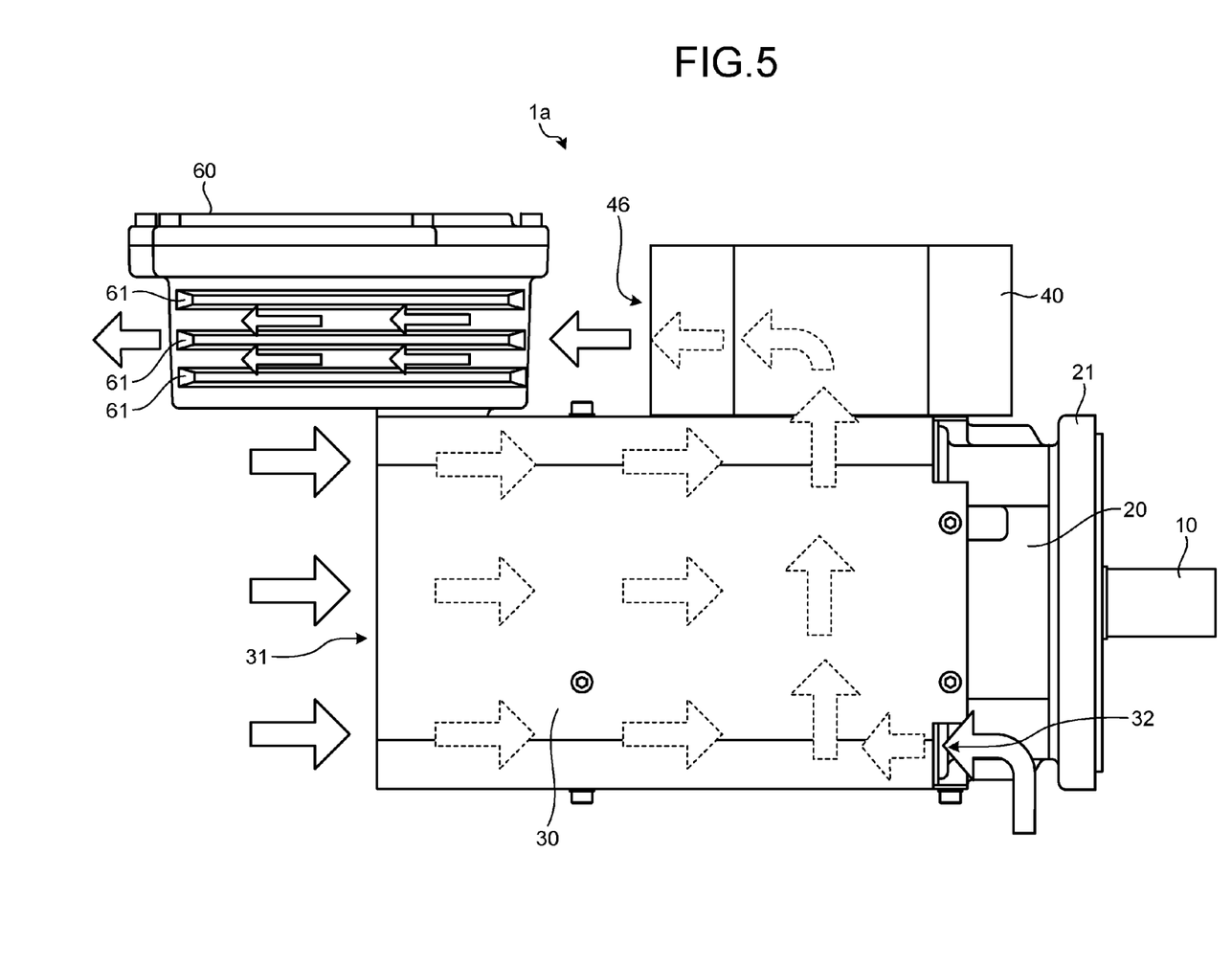
FIG. 5 is an explanation diagram illustrating a rotary electric machine when being seen from its side according to a second embodiment.

Next, a rotary electric machine according to the second embodiment will be explained with reference to FIG. 5. FIG. 5 is an explanation diagram illustrating a rotary electric machine 1a when being seen from its side according to the second embodiment. The same components of FIG. 5 as those of FIG. 1 have the same reference numbers.

Herein, the rotary electric machine 1a is different from the rotary electric machine 1 according to the first embodiment from the viewpoint of the shape of a terminal box 60. In other words, the internal structure and the flow of cooling air of the motor cover 30 and the fan case 40 of the rotary electric machine 1a are similar to the rotary electric machine 1 according to the first embodiment.

For this reason, the shape of the terminal box 60 of the rotary electric machine 1a and the flow of cooling air exhausted from the exhaust hole 46 will be explained below. As illustrated in FIG. 5, the terminal box 60 of the rotary electric machine 1a includes a plurality of third radiation fins 61 that extends on its outer circumferential surface in a direction parallel to the exhaust direction of the cooling air.

As a result, because the radiation surface area of the terminal box 60 is enlarged, the temperature rise of the counter-load-side bearing 24 can be suppressed by effectively radiating heat transmitted from the counter-load-side bracket 22 (see FIG. 2).

Because the third radiation fins 61 extend in the direction parallel to the exhaust direction of the cooling air, the third radiation fins 61 function as a guide that guides the cooling air exhausted from the exhaust hole 46 toward the further counter-load side than the terminal box 60. As a result, because the rotary electric machine 1a can prevent the cooling air that is in contact with the terminal box 60 from staying near the terminal box 60, a cooling efficiency of the rotary electric machine 1a performed by the terminal box 60 can be further improved.

As described above, the terminal box 60 of the rotary electric machine 1a according to the second embodiment is placed at a position facing the exhaust hole 46 of the cooling air on the circumferential surface of the counter-load-side bracket 22 (see FIG. 2), and includes the plurality of third radiation fins 61 that extends in the direction parallel to the exhaust direction of the cooling air on its outer circumferential surface.

As a result, because a heat radiation capability of the terminal box 60 is improved in the rotary electric machine 1a, the rotary electric machine 1a can absorb and radiate heat from the counter-load-side bracket 22 by using the terminal box 60 to more favorably cool the counter-load-side bearing 24 provided in the counter-load-side bracket 22.

Third Embodiment

Figure 6:
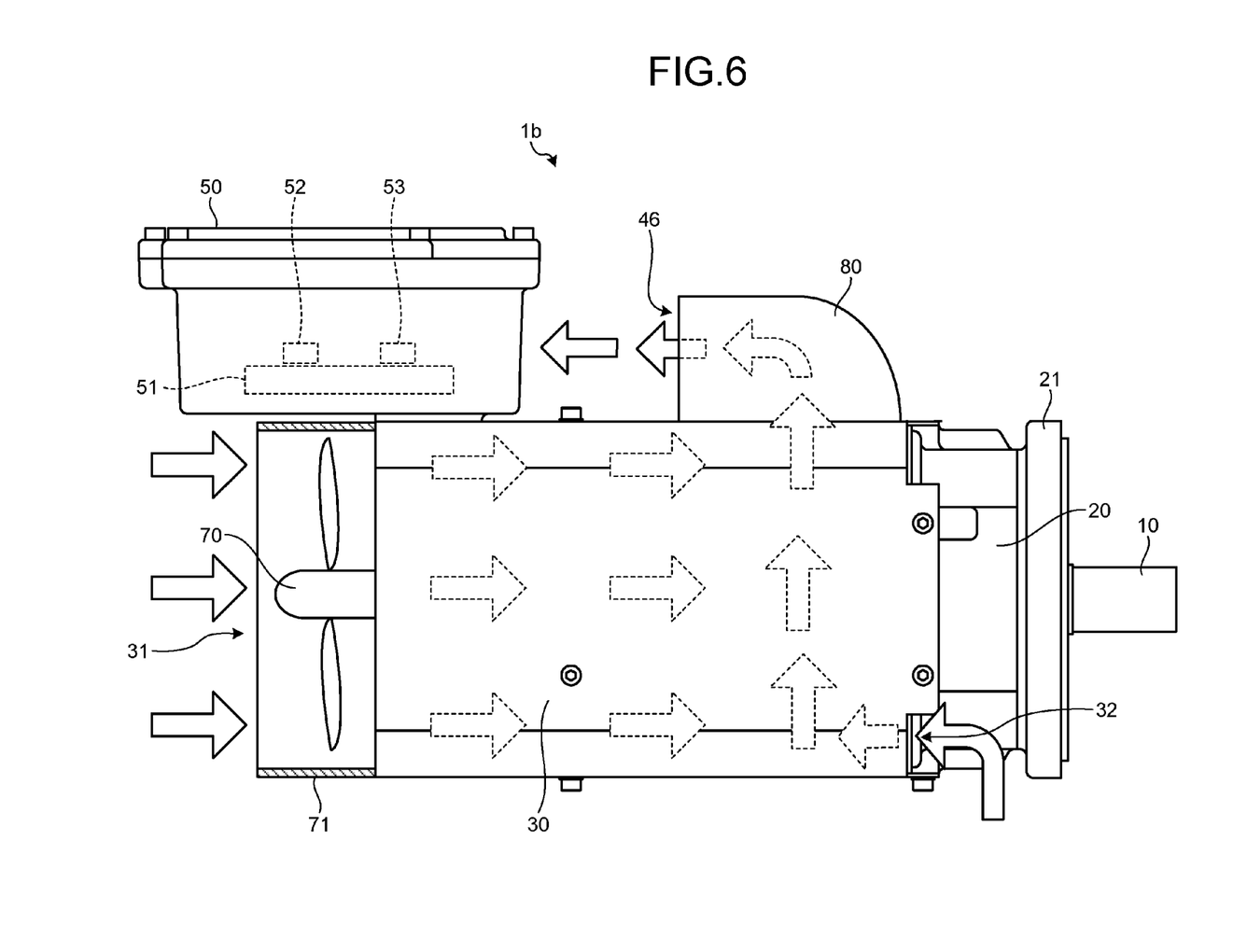
FIG. 6 is a partially sectional schematic diagram illustrating a rotary electric machine when being seen from its side according to a third embodiment.

Next, a rotary electric machine according to the third embodiment will be explained with reference to FIG. 6. FIG. 6 is a partially sectional schematic diagram illustrating a rotary electric machine 1b when being seen from its side according to the third embodiment. The same components of FIG. 6 as those of FIG. 1 have the same reference numbers.

The rotary electric machine 1b is different from the rotary electric machine 1 according to the first embodiment from the viewpoint of the type and arrangement position of a cooling fan 70. In other words, the internal structure and the flow of cooling air of the motor cover 30 of the rotary electric machine 1b are similar to the rotary electric machine 1 according to the first embodiment. For this reason, a point at which the rotary electric machine 1b is different from the rotary electric machine 1 according to the first embodiment will be explained below.

As illustrated in FIG. 6, the rotary electric machine 1b includes the cooling fan 70 that is housed in a fan case 71 provided on the counter-load-side end of the motor cover 30. The cooling fan 70 is an axial-flow fan that is placed in such a manner that the rotation axis of the cooling fan 70 is parallel to the rotating shaft 10 of the rotary electric machine 1b and that sucks cooling air from the first suction hole 31 into the motor cover 30.

The motor cover 30 includes an exhaust hood 80 on its load-side circumferential surface, through which the exhaust hole 46 that turns the exhaust direction of the cooling air to the counter-load side is formed.

In the rotary electric machine 1b, the temperature of the cooling air at the counter-load-side end of the motor frame 20 is low inside the motor cover 30. Therefore, the rotary electric machine 1b can preferentially cool the counter-load-side bracket 22 placed at the counter-load side of the motor.

In this way, because the rotary electric machine 1b according to the third embodiment includes the cooling fan 70 that sends cooling air into the motor cover 30 at the counter-load-side end of the motor cover 30, the rotary electric machine 1b can favorably cool the counter-load-side bearing 24 (see FIG. 2) provided in the counter-load-side bracket 22.

It has been explained in the first and second embodiments that the fan case 40 is defined as a member that covers the cooling fan 43 for convenience sake. If it is considered that the cooling fan 43 is a component of the rotary electric machine 1 and the rotary electric machine 1a, the fan case 40 may be defined as a part of the motor cover 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotary electric machine comprising:
    a tubular motor frame that includes therein a stator and a rotor;
    a tubular motor cover that houses the motor frame and includes a suction hole for cooling air at a counter-load side; and
    a fan case that is provided on a load-side outer circumferential surface of the motor cover,
    wherein the fan case comprises:
        an exhaust hole that turns an exhaust direction of the cooling air to the counter-load side; and
        a cooling fan that sucks the cooling air from the suction hole into the motor cover and exhausts the cooling air from the exhaust hole to an outside of the motor cover, and
    wherein the motor frame further includes:
        a plurality of first radiation fins that are provided on a counter-load-side outer circumferential surface of the motor frame to extend in a direction parallel to a rotation axis of the rotor and inside the cooling air from the suction hole provided at the counter-load side to the load-side; and
        a plurality of second radiation fins that are provided opposite to the fan case on the load-side outer circumferential surface of the motor frame that corresponds to the fan case to extend so as to circle around the motor frame and guide the cooling air guided by the first radiation fins to the cooling fan.

2. The rotary electric machine according to claim 1, wherein the motor cover further includes a suction hole that is located at a position facing the cooling fan while placing the motor frame therebetween.

3. The rotary electric machine according to claim 1, further comprising a terminal box that is placed opposite to the exhaust hole on an outer circumferential surface of a counter-load-side bracket that bears a counter-load side of a rotation axis, houses therein an external connection terminal, and is provided with radiation fins, on its outer circumferential surface, which extend in a direction parallel to the exhaust direction of the cooling air.

4. The rotary electric machine according to claim 2, further comprising a terminal box that is placed opposite to the exhaust hole on an outer circumferential surface of a counter-load-side bracket that bears a counter-load side of a rotation axis, houses therein an external connection terminal, and is provided with radiation tins, on its outer circumferential surface, which extend in a direction parallel to the exhaust direction of the cooling air.

5. The rotary electric machine according to claim 1, wherein the motor cover further includes a communicating hole via which an internal space of the fan case and an internal space of the motor cover communicate with each other.

6. The rotary electric machine according to claim 2, wherein the motor cover further includes a communicating hole via which an internal space of the fan case and an internal space of the motor cover communicate with each other.

7. The rotary electric machine according to claim 5, wherein the second radiation tins are provided corresponding to the communicating hole.

8. The rotary electric machine according to claim 6, wherein the second radiation tins are provided corresponding to the communicating hole.

9. The rotary electric machine according to claim 3, wherein a size of the exhaust hole and a size of the terminal box in a height direction from an outer circumferential surface of the motor cover are substantially the same.

10. A rotary electric machine comprising:
a tubular motor frame that includes therein a stator and a rotor;
a tubular motor cover that houses the motor frame and includes a suction hole for cooling air at a counter-load side;
a fan case that is provided on a load-side outer circumferential surface of the motor cover, the fan case comprising:
an exhaust hole that turns an exhaust direction of the cooling air to the counter-load side; and
a cooling fan that sucks the cooling air from the suction hole into the motor cover and exhausts the cooling air from the exhaust hole to an outside of the motor cover; and
a terminal box that is placed opposite to the exhaust hole on an outer circumferential surface of a counter-load-side bracket that bears a counter-load side of a rotation axis, houses therein an external connection terminal, and is provided with radiation fins, on its outer circumferential surface, which extend in a direction parallel to the exhaust direction of the cooling air,
wherein a size of the exhaust hole and a size of the terminal box in a height direction from an outer circumferential surface of the motor cover are substantially the same.

* * * * *